US011993415B2

(12) United States Patent
Schinelli et al.

(10) Patent No.: US 11,993,415 B2
(45) Date of Patent: May 28, 2024

(54) MACHINE AND METHOD FOR LABELING CONTAINERS

(71) Applicant: P.E. LABELLERS S.P.A., Porto Mantovano (IT)

(72) Inventors: Nicola Schinelli, Mantova (IT); Bruno Negri, Marmirolo (IT)

(73) Assignee: P.E. Labellers S.P.A., Porto Mantovano (IT)

( * ) Notice: Subject to any disclaimer, the term of this patent is extended or adjusted under 35 U.S.C. 154(b) by 516 days.

(21) Appl. No.: 16/471,244

(22) PCT Filed: Dec. 14, 2017

(86) PCT No.: PCT/EP2017/082889
§ 371 (c)(1),
(2) Date: Jun. 19, 2019

(87) PCT Pub. No.: WO2018/114618
PCT Pub. Date: Jun. 28, 2018

(65) Prior Publication Data
US 2020/0165025 A1 May 28, 2020

(30) Foreign Application Priority Data
Dec. 20, 2016 (IT) ........................ 102016000128413

(51) Int. Cl.
*B65C 3/16* (2006.01)
*B65C 9/18* (2006.01)
(Continued)

(52) U.S. Cl.
CPC .............. *B65C 3/16* (2013.01); *B65C 9/1807* (2013.01); *B65C 9/226* (2013.01); *B65C 9/42* (2013.01);
(Continued)

(58) Field of Classification Search
CPC ... B65C 3/16; B65C 9/1807; Y10T 156/1322; Y10T 156/1339
See application file for complete search history.

(56) References Cited

U.S. PATENT DOCUMENTS 4,632,721 A 12/1986 Hoffmann et al.
4,735,668 A 4/1988 Hoffmann
(Continued)

FOREIGN PATENT DOCUMENTS

CN 1252034 A 5/2000
CN 103964037 A 8/2014
(Continued)

OTHER PUBLICATIONS

PCT, European Patent Office (ISA/EP), International Search Report, International Application No. PCT/EP2017/082889, 4 pages (dated Apr. 10, 2018).
(Continued)

*Primary Examiner* — George R Koch
*Assistant Examiner* — Christopher C Caillouet
(74) *Attorney, Agent, or Firm* — THOMPSON HINE LLP

(57) ABSTRACT

A machine and a method for labeling containers, the machine including a transfer drum, fed by an assembly for unwinding a labeling ribbon and provided with cutting elements, which is adapted to bring the individual labels, separated after cutting, into contact with corresponding containers which are supported by a conveyor; a roller for spreading adhesive faces the transfer drum and is designed to apply, to the labels that are present on the ribbon, at least one line of adhesive prior to their separation from the ribbon.

11 Claims, 15 Drawing Sheets

(51) Int. Cl.

| | |
|---|---|
| ***B65C 9/22*** | (2006.01) |
| ***B65C 9/42*** | (2006.01) |
| *B65C 9/00* | (2006.01) |

(52) U.S. Cl.

CPC . *B65C 2009/0071* (2013.01); *Y10T 156/1322* (2015.01); *Y10T 156/1339* (2015.01)

(56) References Cited

U.S. PATENT DOCUMENTS

| | | | | |
|---|---|---|---|---|
| 6,235,345 | B1 | 5/2001 | Williamson | |
| 2001/0017181 | A1* | 8/2001 | Otruba | B65C 9/1819 156/64 |
| 2003/0010433 | A1 | 1/2003 | Williamson | |
| 2010/0300614 | A1* | 12/2010 | Deckert | B65C 9/1819 156/256 |
| 2014/0209247 | A1 | 7/2014 | Carmichael | |
| 2016/0236805 | A1 | 8/2016 | Skopek | |
| 2016/0280411 | A1 | 9/2016 | Carmichael | |
| 2017/0081070 | A1* | 3/2017 | Bardini | B65C 9/1803 |

FOREIGN PATENT DOCUMENTS

| | | | |
|---|---|---|---|
| CN | 105000235 | A | 10/2015 |
| CN | 105636871 | A | 6/2016 |
| CN | 105984632 | A | 10/2016 |
| DE | 102007009484 | A1 | 8/2008 |
| DE | 102013215999 | A1 | 2/2015 |
| DE | 102014223594 | A1 | 5/2016 |
| EP | 2824034 | A1 | 1/2015 |
| JP | S6293178 | A | 4/1987 |
| JP | S63152531 | A | 6/1988 |
| JP | 2002531341 | A | 9/2002 |
| WO | WO 0034130 | A1 | 6/2000 |
| WO | WO 2005/115844 | A1 | 12/2005 |
| WO | 2009/071237 | A1 | 6/2009 |

OTHER PUBLICATIONS

PCT, European Patent Office (ISA/EP), Written Opinion of the International Searching Authority, International Application No. PCT/EP2017/082889, 6 pages (dated Apr. 10, 2018).

* cited by examiner 10
10b
100
18
10
10
10a
13b
5
13a
2
7a
11a
11
14a
14b
9
8
5
140d
140a
8
9
140b
8
5
9
12
2a
8
140c
9
5
3
3b
3a
4
7b

MACHINE AND METHOD FOR LABELING CONTAINERS

The present invention relates to a machine and a method for labeling containers.

As is known, labeling machines are widely used which make it possible to automatically carry out the application of printed labels on containers, in general, and bottles, in particular.

Generally, labeling machines have a conveyor of the bottles, which is constituted, typically, by a rotating carousel provided with a plurality of supports for the individual bottles, which are adapted to rotate the bottles about their own axis, and such machines are further provided with a transfer drum that makes it possible to apply, on each bottle that is progressively presented before the transfer drum, a label that is obtained by cutting a continuous ribbon of labels which is wound on a reel.

Such ribbon can have, on the face intended to make contact with the bottles, lines of adhesive preapplied to the labels, at the leading, or front, edges and at the trailing, or rear, edges of the labels, depending on their direction of advancement, or on their entire surface, or they can be without preapplied adhesive and, in such case, the labeling unit is provided with a gluing assembly that spreads the adhesive onto the labels in line at the moment of use i.e. just before they are applied to the bottles.

More specifically, labeling machines used to handle the second type of ribbon are provided with a roller for unwinding the ribbon from a reel, which in turn feeds a cutting drum provided with blades, which, by cooperating with a fixed blade or by way of their movement driven by respective actuators, cut the ribbon between one label and the next. Subsequently, the individual labels, once separated after cutting, are transferred from the cutting drum to the transfer drum, which in this case laterally faces a roller for spreading the adhesive, which applies, on the individual labels, two strips of adhesive at their leading and trailing edges, i.e. on their front and rear edges according to their direction of advancement impressed by the transfer drum, before being taken by the transfer drum to adhere to the corresponding bottles supported by the rotating carousel.

In particular, the transfer drum is divided into divisions or sectors, each one of which is adapted to receive a single label from the cutting drum. At opposite ends of the various sectors of the transfer drum are two adhesive bonding regions, which are in relief with respect to the main lateral surface of the transfer drum and are defined by respective blocks called runners, on which the leading and trailing edges of the labels come to rest, so that when the labels pass in front of the adhesive spreading roller, the latter applies only two strips of adhesive to those labels, at their leading and trailing edges.

It must be noted that, in order to prevent the labels from remaining attached to the adhesive spreading roller, they are kept adhered to the lateral surface of the transfer drum by way of the application of a considerable force of attraction obtained by way of the forced suction of air through holes provided on the lateral surface of the transfer drum.

During operation of the labeling machine, the unwinding roller supplies the cutting drum in each instance with a section of the ribbon that corresponds to the label intended to be applied on the bottle arranged on a determined support of the carousel, and the cutting drum then cuts that label so as to make it subsequently available, by way of the transfer drum, for the corresponding bottle.

Since individual separated labels adhere to the transfer drum, in traditional machines it often happens that the spreading roller can smear the transfer drum with adhesive, which results in the machine having to be shut down in order to carry out the necessary cleaning thereof.

In addition to labeling machines, the bottling sector also uses blow-molding machines, which produce the bottles, and filling machines, which fill and cap the bottles.

Nowadays the use is increasingly widespread of "tri-block" packaging systems, in which the labeling machines are inserted in-line between a blow-molding machine, arranged upstream, and a filling machine, arranged downstream, without the interposition of conveyor belts that create a buffer of bottles between the various different machines.

With triblock systems, it can therefore happen that, owing to an incorrect operation of the blower, a bottle may be absent from the sequence of bottles in output from the blower and in input to the labeling machine, with the result that the support of the carousel of the labeling machine that should have held a bottle, which in reality did not arrive, remains empty.

In this situation, in order to prevent the label from being dispensed notwithstanding the absence of the corresponding bottle, in conventional labeling machines there is a control system provided with a sensor, usually implemented by a photocell, which is designed to send a clearance signal to allow production of the labels as a consequence of the effective presence of the corresponding bottles on the supports of the carousel.

If one or more bottles is missing from the supports of the carousel, the control system, following a signal sent by the photocell, will stop, or slow, the unwinding roller in order to not feed the cutting drum, so as to not produce the labels that should have reached the missing bottles, and will later restore the rotation speed of the unwinding roller after the absence of bottles has ceased.

Also in the situation of missing bottles on the supports of the carousel, in order to prevent the adhesive spreading roller from smearing adhesive on the adhesive bonding regions of the sectors that do not receive labels owing to lack of the corresponding bottles on the carousel, the spreading roller is provided with movement means that make it possible to bring it from its active position of substantial contact with the adhesive bonding regions of the transfer drum, in which the spreading roller is capable of applying strips of adhesive to the labels, to an inactive position of separation from the adhesive bonding regions of the transfer drum.

The displacement of the adhesive spreading roller from the active position to the inactive position must take place in the time that elapses between the passing, in front of the adhesive spreading roller, of the adhesive bonding region of the transfer drum on which rests the trailing edge of the last label to be dispensed prior to the absence of bottles, and the immediately subsequent adhesive bonding region on which should rest the leading edge of the first label not transferred from the cutting drum owing to the absence of the corresponding bottle on the carousel.

Since the distance between the trailing adhesive bonding regions and the leading adhesive bonding regions of the various sectors of the transfer drum must be reduced, in order to keep the overall dimensions of the transfer drum contained, then the passing of the adhesive spreading roller from the active position to the inactive position, if one or more bottles is missing, and the subsequent return from the inactive position to the active position, to the dispensing by the cutting drum of the label intended for the first bottle after the absence, must occur in an extremely short time.

This fact, in addition to determining the limitations in the operating speeds that can be attained by the machine, also entails difficulties in its construction.

The aim of the present invention is to provide a solution to the above mentioned problems, by devising a labeling machine that makes it possible to carry out the labeling of containers at high speed, while still having a sufficiently long time to move the adhesive spreading roller between the active position and the inactive position, in the event of the absence of one or more containers.

Within this aim, an object of the present invention is to provide a labeling machine that makes it possible to avoid the risk of smearing the transfer drum with adhesive.

Another object of the present invention is to provide a labeling machine that makes it possible to effectively prevent the possibility that the labels could adhere to the adhesive spreading roller.

Another object of the present invention is to provide a labeling machine that can operate indifferently both with pre-glued labeling ribbons and with non-pre-glued labeling ribbons.

Another object of the present invention consists of providing a labeling machine that is simple to provide in terms of construction.

Another object of the present invention is to provide a labeling machine that is capable of offering the widest guarantees of reliability and safety in its operation.

A still further object of the present invention is to provide a labeling machine that is low cost so as to be competitive from a purely economic viewpoint as well.

This aim and these and other objects which will become better apparent hereinafter are achieved by a machine for labeling containers, according to the invention, according to claim 1, and by a method of labeling containers, according to the invention, according to claim 13.

Further characteristics and advantages will become better apparent from the description of a preferred, but not exclusive, embodiment of the machine according to the invention, which is illustrated by way of non-limiting example in the accompanying drawings wherein.

Figure 1:
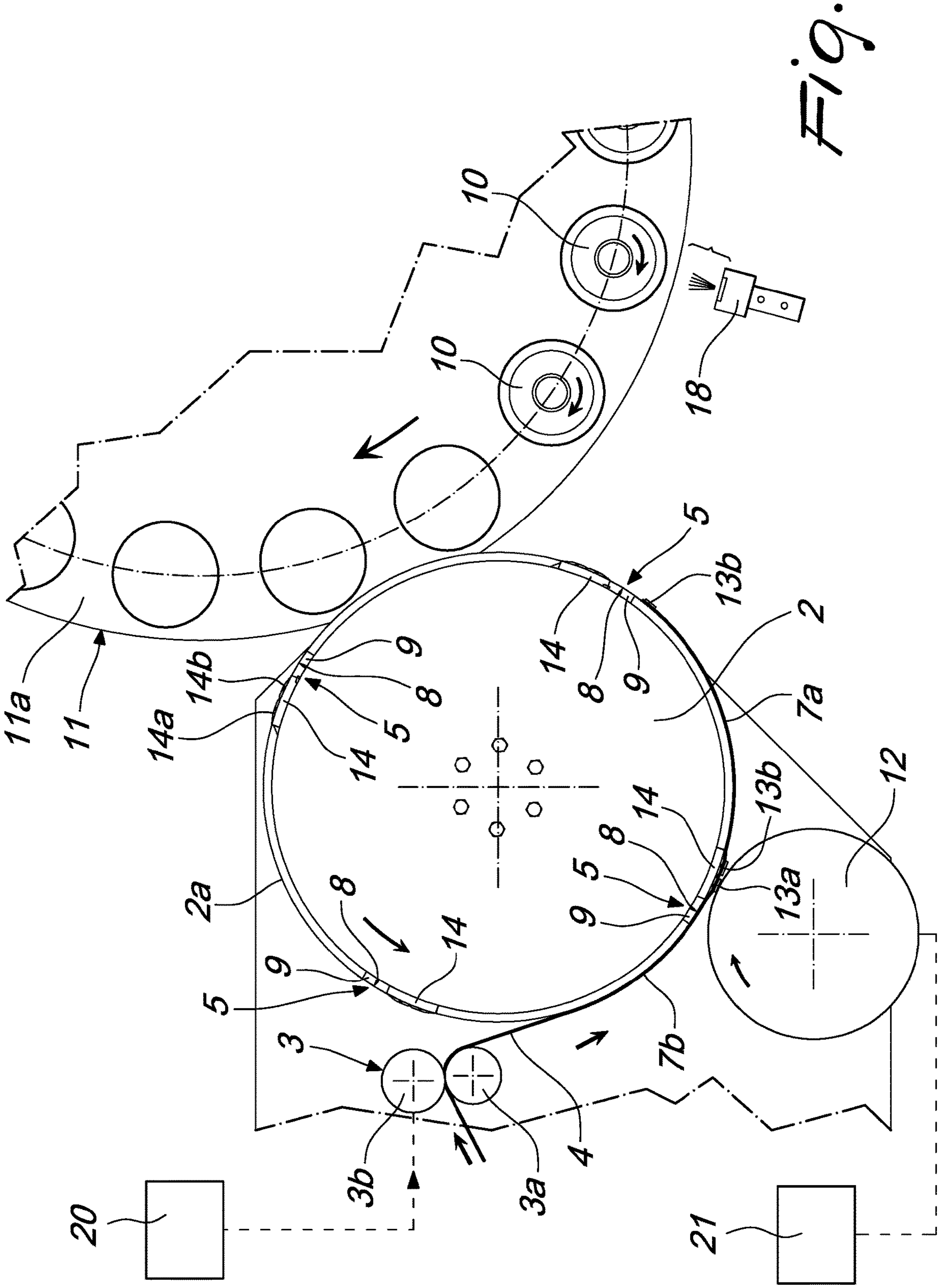
FIGS. 1 to 6 are schematic plan views from above of the machine according to the invention in a sequence of steps of its operation.

With reference to the figures, the machine for labeling containers, according to the invention, generally designated with the reference numeral 1, comprises a transfer drum 2 that is designed to receive, from an unwinding assembly 3, which comprises, for example, at least one dispenser roller 3*a* and a feeder counter-roller 3*b*, a labeling ribbon 4, without preapplied adhesive, which bears, printed consecutively along its extension, a plurality of labels and which comes from a reel, not shown, by way of the interposition of tensioning means, also not shown for the sake of simplicity.

Advantageously, the transfer drum 2 has, on its lateral surface 2*a*, a plurality of holes which are connected to aspiration means, not shown, which ensure the ribbon 4 is kept adhering to its lateral surface 2*a*.

The transfer drum 2 is, furthermore, provided with cutting means 5, which are distributed, mutually angularly spaced apart, about the axis of the transfer drum proper and can be activated on command, independently of each other, by respective actuation means, in order to carry out the cutting of the ribbon 4 at the separation portion 6 between two consecutive labels 7*a*, 7*b* that are present on the ribbon 4.

For example, each of the cutting means 5 comprises a respective blade 8, which is integral with the transfer drum 2, and the corresponding actuation means comprise a chamber 9, defined in the transfer drum 2 and open at the lateral surface 2*a* of the transfer drum 2, which receives the blade 8 and which is adapted to be connected to air extraction means, which make it possible to attract the ribbon 4 inward into the chamber 9 and against the blade 8, so as to result in the cutting thereof.

In particular, the transfer drum 2 is designed to bring the individual labels, separated after cutting, into contact with corresponding containers 10, which are supported by a conveyor 11, which is constituted, for example, by a rotating carousel 11*a* which is provided with a plurality of supports which are designed to receive a respective container 10 resting thereon and to rotate it about its own axis.

According to the invention, a roller 12 for spreading adhesive faces the transfer drum 2 and its function is to apply, by contact, to the labels that are present on the ribbon 4, at least one line of adhesive 13, before the labels are separated from the ribbon 4 by way of the cutting carried out by the cutting means 5, following the activation of their actuation means.

In particular, the transfer drum 2 is provided with a plurality of adhesive bonding regions 14, which are distributed, mutually spaced apart, about the transfer drum 2.

Such adhesive bonding regions 14 are, with at least one portion thereof, in relief with respect to the lateral surface 2*a* of the transfer drum 2 and are adapted to receive, by coming to rest thereon, the leading and trailing edges of the labels that are present on the ribbon 4, in order to allow, in cooperation with the spreading roller 12, the application of respective strips of glue 13*a*, 13*b* on the leading and trailing edges of the labels.

In more detail, each adhesive bonding region 14 is conveniently provided with a respective pair of resting contact surfaces 14*a*, 14*b*, which are both arranged in relief with respect to the main lateral surface 2*a* of the transfer drum 2 and designed, respectively, to receive, by coming to rest thereon, one the trailing edge and the other the leading edge of two consecutive labels 7*a*, 7*b* that are present on the ribbon 4, before the latter are separated from each other and, therefore, from the ribbon 4 by the activation of the cutting means 5.

Figure 14:
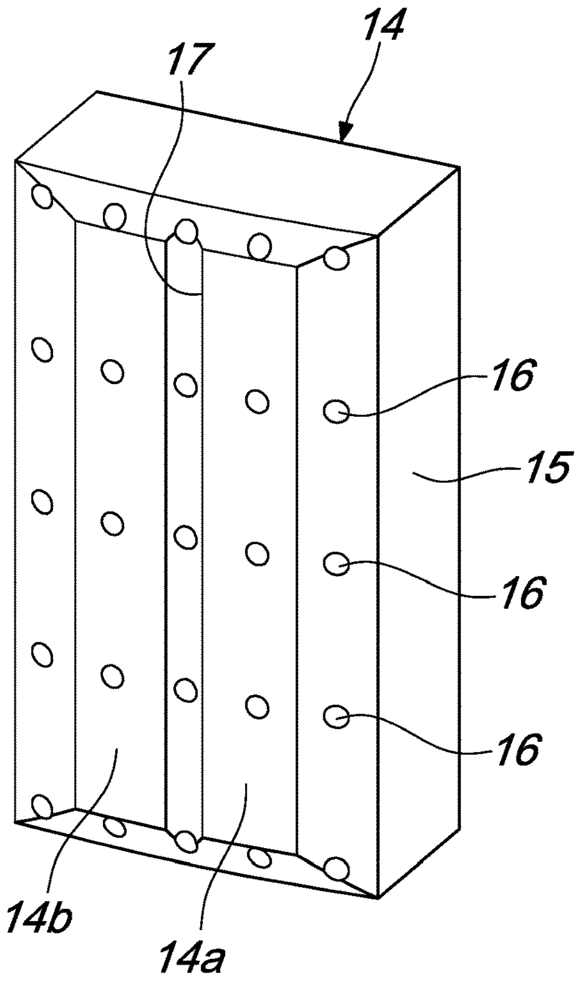
FIG. 14 is a perspective view of a runner associated with a transfer drum of the machine according to the invention.
Figure 15:
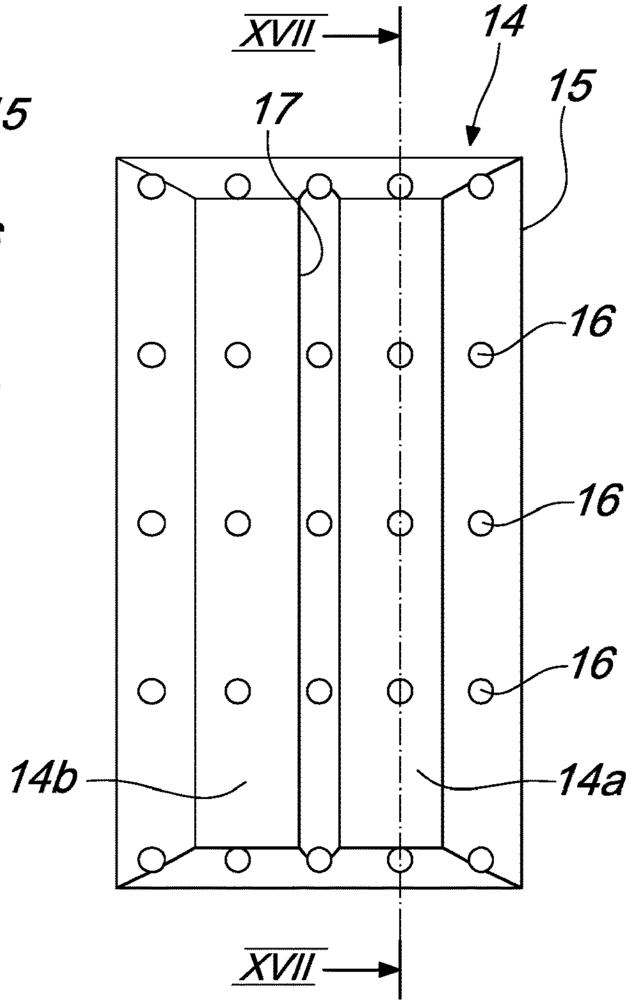
FIG. 15 is a front elevation view of the runner.
Figure 16:
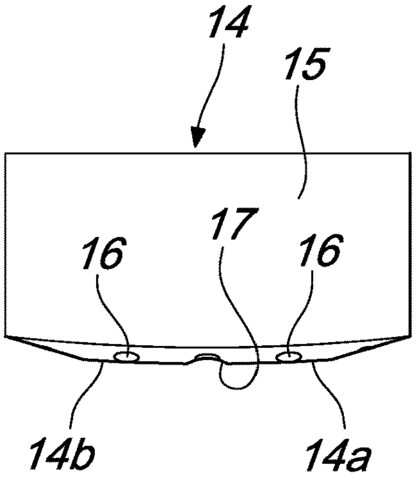
FIG. 16 is a view from above of the runner.
Figure 17:
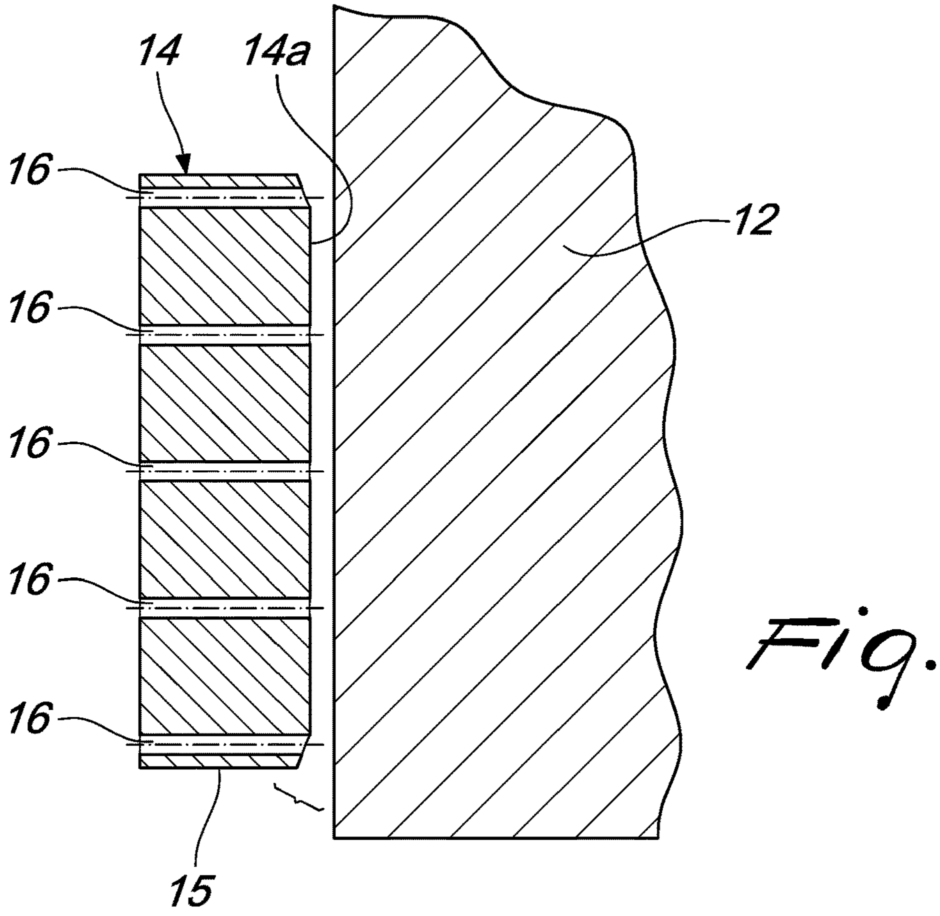
FIG. 17 is a cross-sectional view taken along the line X-X in FIG. 15 of the runner facing an adhesive spreading roller.
Figure 18:
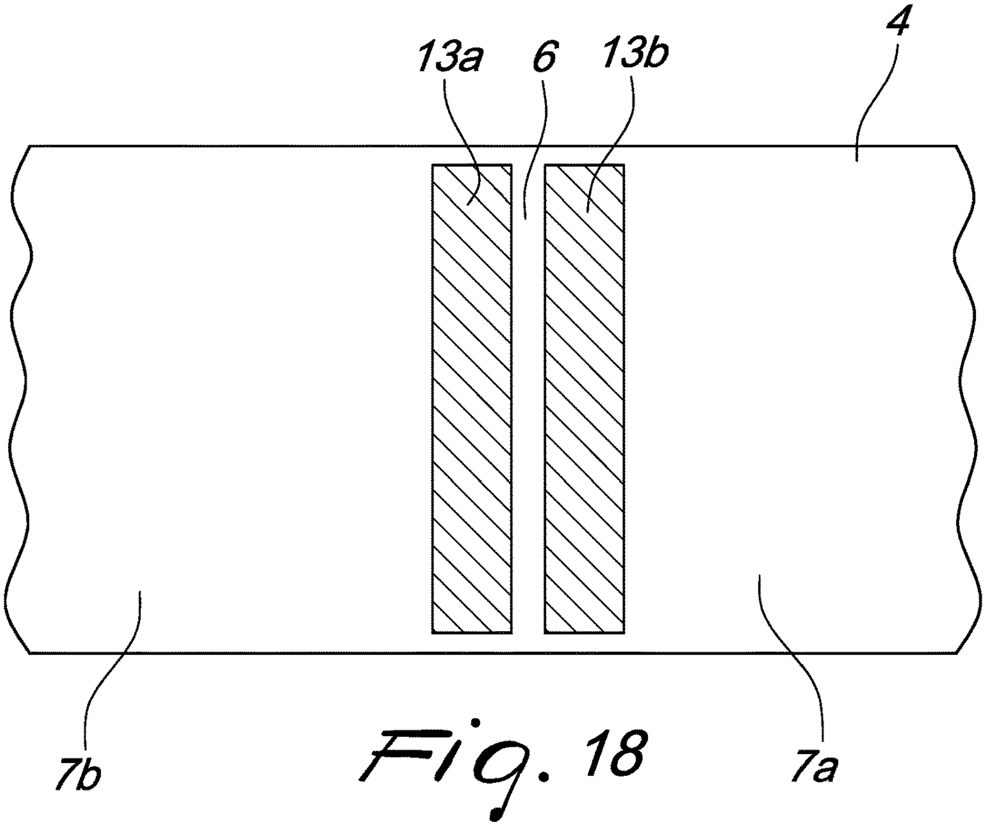
FIG. 18 shows a labeling ribbon used by the machine according to the invention, with two strips or lines of adhesive applied.

Conveniently, each adhesive bonding region 14 is provided by a respective runner which is constituted, in essence, by a block 15, shown in particular in FIG. 14, which is supported by the transfer drum 2 and on which are defined the resting contact surfaces 14*a*, 14*b*. Advantageously, the block 15 is crossed by ports 16 that are connected to the aspiration means associated with the transfer drum 2, in order to ensure the adherence of the ribbon 4 to the adhesive bonding regions 14 as well.

Between the respective resting contact surfaces 14*a*, 14*b*, the adhesive bonding regions 14 have, furthermore, a seat 17 that extends toward the axis of the transfer drum 2 and which is designed to receive, internally, the separation portion 6 between two consecutive labels 7*a*, 7*b* that are present on the ribbon 4. Such seat 17 is in essence provided by a recess defined on the outer surface of the block 15.

In particular, the adhesive bonding regions 14 are provided with means that make it possible to attract the separation portion 6 between the labels 7*a*, 7*b* toward the bottom of the seat 17, so as to prevent the spreading roller 12 from applying the adhesive on the separation portion 6 as well. Such means of attraction are provided by the ports 16 in the block 15 at the recess that defines the seat 17.

As illustrated, each one of the adhesive bonding regions 14 is, conveniently, associated with respective means 5 of cutting the ribbon 4, which are advantageously arranged laterally adjacent to those regions.

More specifically, the cutting means 5 are positioned behind the corresponding adhesive bonding region 14, with respect to the direction of rotation of the transfer drum 2.

In this manner, the transfer drum 2 is, in essence, divided into multiple divisions, each one of which extends for a respective portion of the lateral surface 2*a* of the transfer drum 2 which is comprised between two consecutive adhesive bonding regions 14. In particular, each one of the divisions of the transfer drum 2 is designed to progressively receive, so that it adheres, a label of the ribbon 4 and is provided with respective means 5 of cutting the ribbon 4 which are located at the front end thereof, with respect to the direction of rotation of the transfer drum 2.

The transfer drum 2 is rotationally actuated at a constant speed, which is synchronized with the speed of the conveyor 11, and, more specifically, with reference to the embodiment shown, it is made to rotate so as to be in phase with the rotating carousel 11*a*, so as to be able to progressively deliver the individual labels obtained after cutting to the container 10 located on a determined support 11*b* of the rotating carousel 11*a*.

Advantageously, the unwinding assembly 3 is driven by control means 20, shown schematically only in FIG. 1 for convenience, which make it possible to vary the speed with which the ribbon 4 is fed to the transfer drum 2, during the rotation of the latter.

More specifically, in a first step of operation, the control means 20 command the actuation of the unwinding assembly 3 so as to feed the ribbon 4 to the transfer drum 2 at a first speed, which is synchronized with respect to the speed of the transfer drum 2. In this step the ribbon 4 is entrained by the transfer drum 2 without slipping.

Subsequently, once the adhesive bonding region 14 of the transfer drum 2, with the ribbon 4 resting on it, passes in front of the spreading roller 12, the control means 20 command a slowing of the unwinding assembly 3, in order to feed the ribbon 4 to the transfer drum 2 at a second speed, which is lower than the first speed, with consequent slipping of the transfer drum 2 with respect to the ribbon 4, so as to bring the cutting means 5 immediately behind the adhesive bonding region 14 on which the ribbon 4 rests to the separation portion 6 between the two consecutive labels 7*a*, 7*b* on which the spreading roller 12 has applied the adhesive, so that such cutting means 5, following the subsequent activation of the corresponding actuation means, can carry out the separation of the label 7*a* from the ribbon 4.

With reference to the embodiment shown, the activation of the cutting means 5 is obtained by providing, in the angular position in which those means are arranged when they are brought to the separation portion 6 between the two consecutive labels 7*a*, 7*b* on which the adhesive has been applied, a suction port that is consequently connected to the chamber 9 of the cutting means 5, causing the suction into the chamber 9 of the separation portion 6 between the labels 7*a*, 7*b* and its consequent contact against the blade 8 that cuts it.

Conveniently, the control means 20 are adapted to command a second slowing or, optionally, in relation to the length of the labels, an inversion of the rotary motion of the unwinding assembly 3, after the separation of each individual label 7*a* from the ribbon 4, thus feeding the ribbon 4 at a third speed, lower than the second speed, in order to allow the distancing of the individual label 7*a*, separated from the ribbon 4, from the remainder of the ribbon 4 and the positioning of the trailing edge of the consecutive label 7*b*, which remained attached to the ribbon 4, on the subsequent adhesive bonding region 14, before the latter arrives at the spreading roller 12.

It should be noted that by providing the transfer drum 2 with a diameter such that the length of each division thereof, measured, in particular, along the circumferential portion described by the lateral surface of the transfer drum between the blades 8 of two consecutive cutting means 5, is equal to the length of each label 7*a*, 7*b* plus the space between the blade 8 of one of the cutting means 5 and the bottom of the seat 7 of the corresponding adhesive bonding region 14, the second slowing can be avoided, with the possibility therefore of subjecting the unwinding assembly 3 to less mechanical stress.

Conveniently, the control means 20 are also connected to a sensor 18 for detecting the presence of containers 10 on the conveyor 11, and the spreading roller 12 is provided with movement means 21, schematically shown in FIG. 1 only for convenience, which are adapted to move the spreading roller 12 from an active position, in which it is close to the transfer drum 2, in order to allow the application of the adhesive to the ribbon 4, to an inactive position, in which it is spaced apart from the transfer drum 2.

In particular, the means 21 of moving the spreading roller 12 can be activated by the control means 20 upon the detection by the sensor 18 of the absence of at least one container 10 on the conveyor 11.

It should be noted that, in the case of the machine according to the invention, the time available to the movement means 21 in order to move the spreading roller 12 from the active position to the inactive position is much longer than that available in traditional machines, in that it corresponds to the time necessary for two consecutive adhesive bonding regions 14 to pass in front of the spreading roller 12 and it is therefore equal to the time taken for an entire division of the transfer drum 2 to pass in front of the spreading roller 12.

Operation of the machine according to the invention is the following.

FIG. 1 shows a first step of operation, in which the ribbon 4, fed by the unwinding assembly 3 to the transfer drum 2, adheres to the transfer drum 2 with the trailing and leading edges of two consecutive labels 7*a* and 7*b* that are present on the ribbon arranged at the resting contact surfaces 14*a* and 14*b* of an adhesive bonding region 14 of the transfer drum 14. In this step, the unwinding assembly 3 feeds the ribbon 4 to the transfer drum 2 at a speed synchronized with the rotation speed of the transfer drum 2, at least until the adhesive bonding region 14, on which the labels 7*a* and 7*b* are resting, passes in front of the spreading roller 12, which deposits, on the trailing edge of the label 7*a* and on the leading edge of the label 7*b*, respective strips 13*a* and 13*b* of adhesive.

Figure 2:
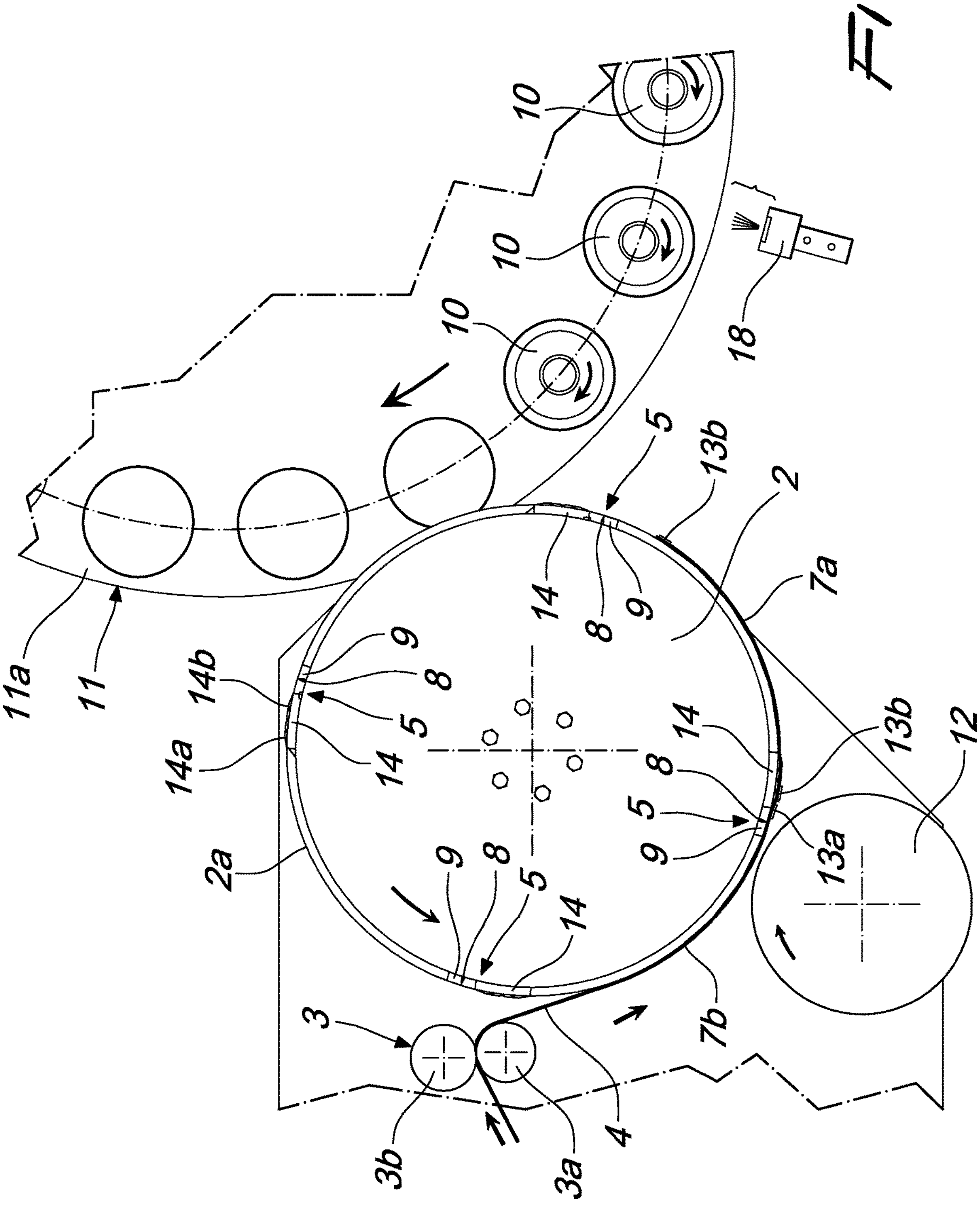
Figure 3:
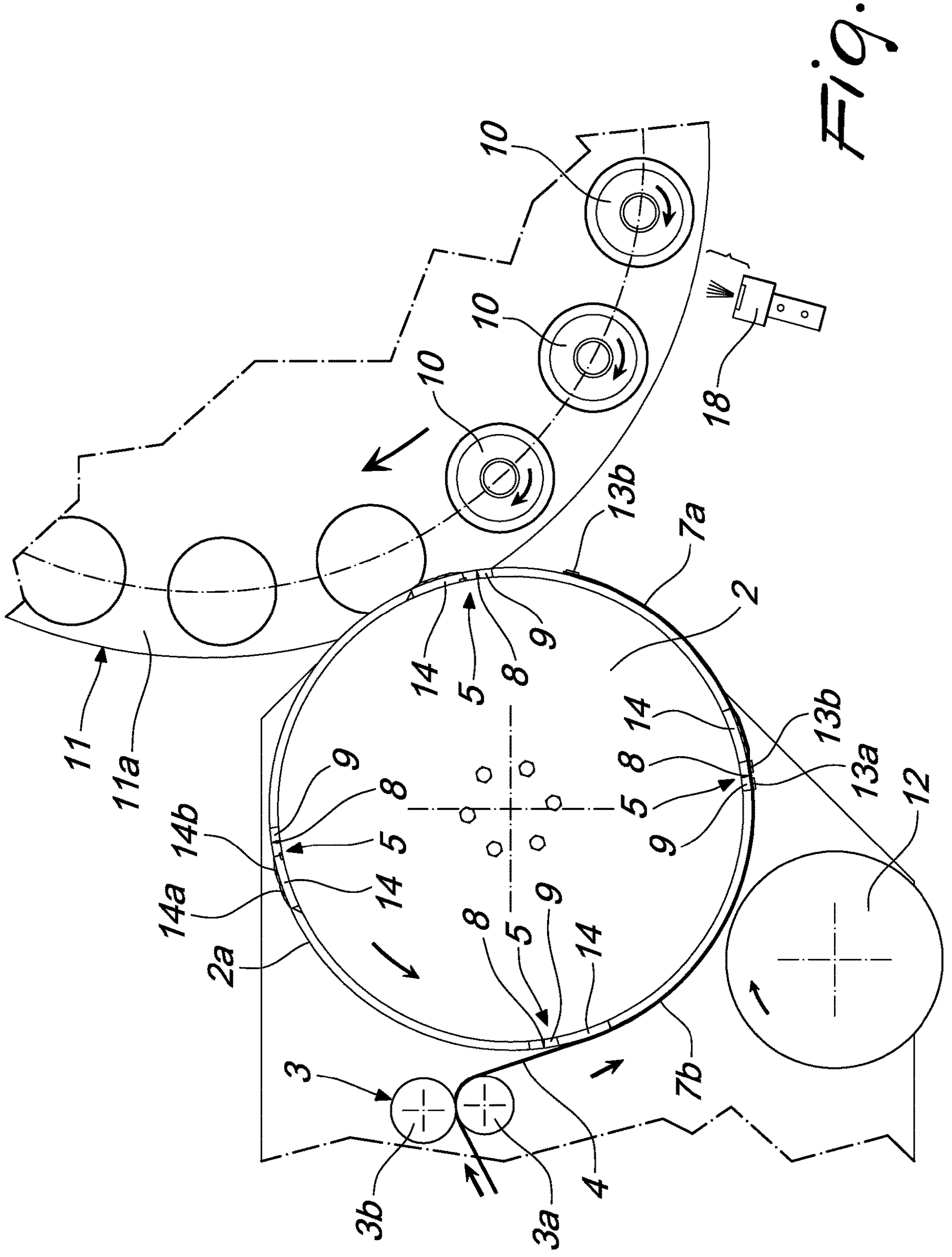

FIG. 2 shows a second step of the operation, in which the control means 20 command a reduction in speed of the unwinding assembly 3 until the cutting means 5 immediately behind the adhesive bonding region 14, which, in the previous step, passed in front of the spreading roller 2, are brought, by way of the slipping of the transfer drum 2 on the ribbon 4, to the separation portion 6 between the two labels 7*a* and 7*b*, as FIG. 3 shows.

Figure 4:
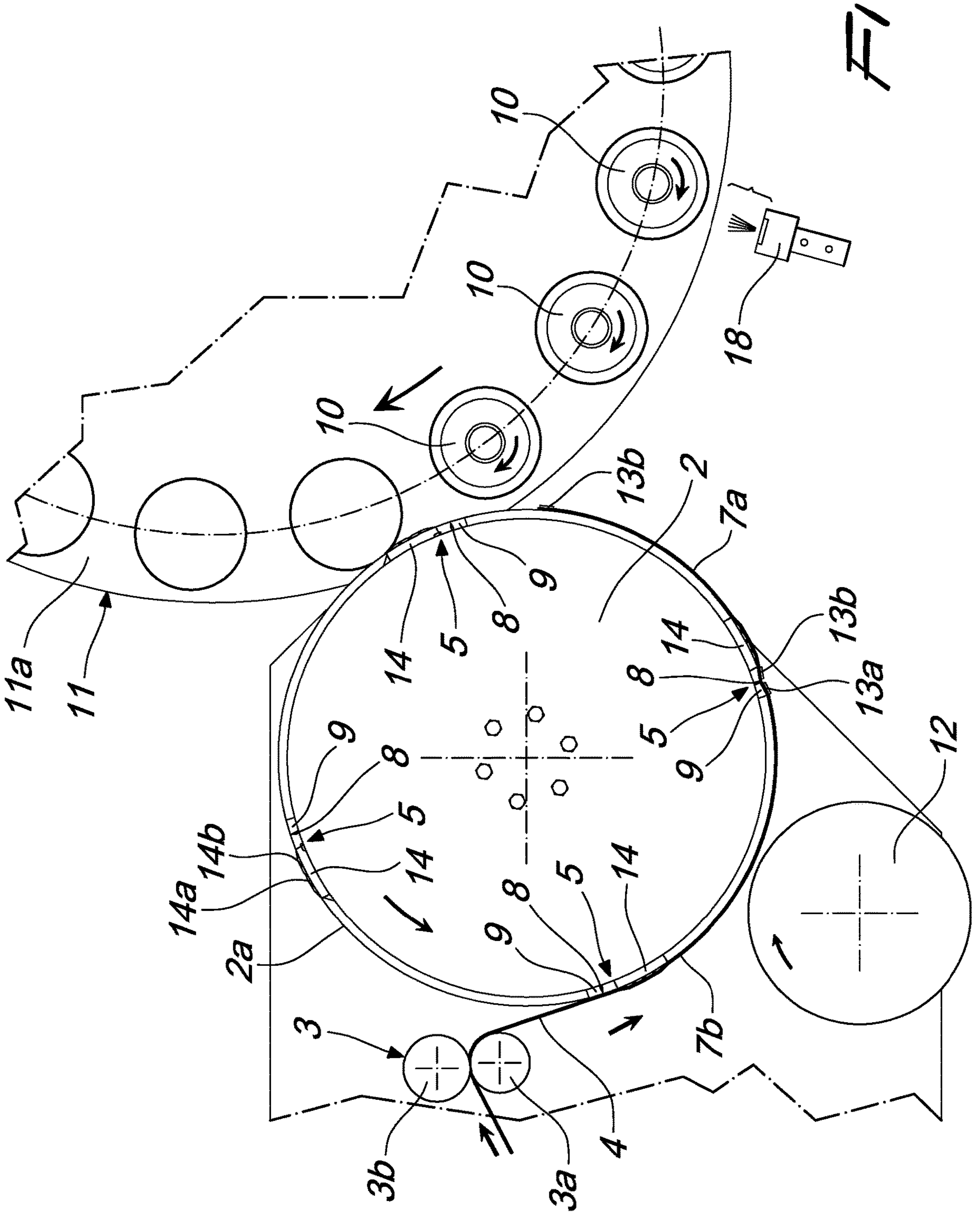
Figure 5:
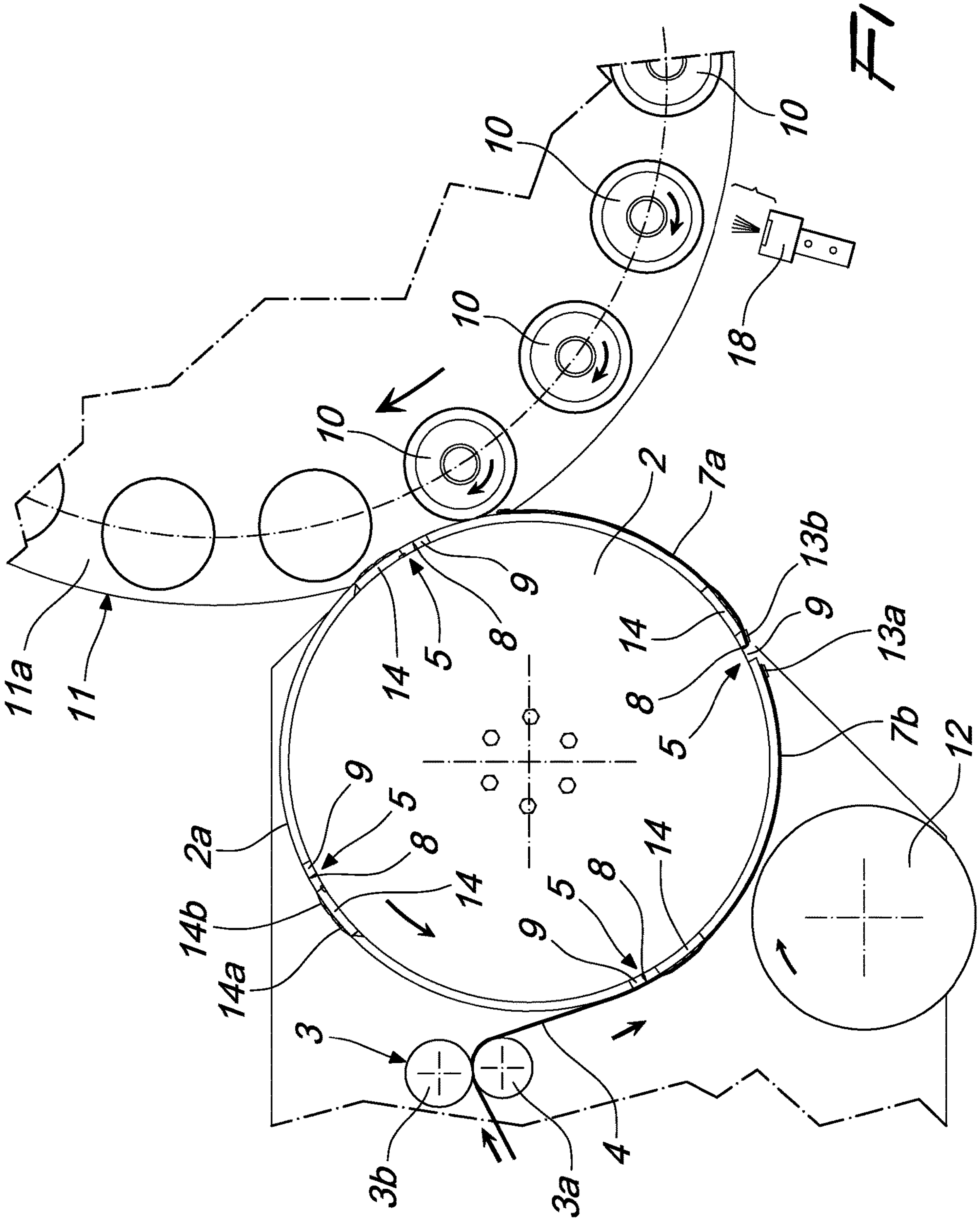

At this point, as shown in FIG. 4, while the unwinding assembly 3 is again actuated by the control means 20 at a speed synchronized with that of the transfer drum, the cutting means 5 which were brought to the separation portion 6 between the two labels 7*a* and 7*b* reach the angular position in which the corresponding actuation means are activated so as to obtain the cutting of the ribbon 4 and the separation of the label 7*a*.

Figure 6:
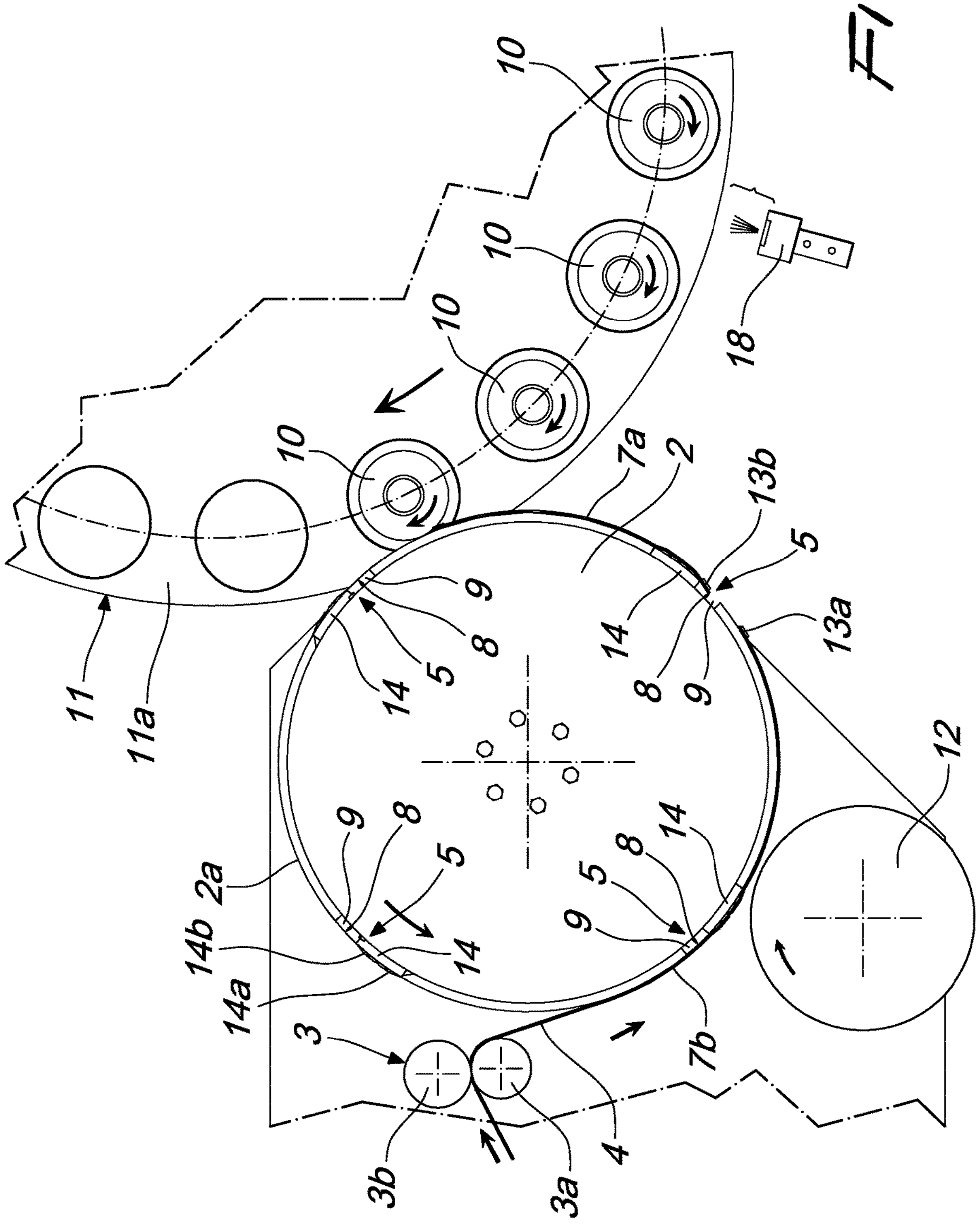

Subsequently, while the rotation of the transfer drum 2 continues with consequent approaching of the label 7*a* to the region of tangency of the transfer drum 2 with the rotating carousel 11*a*, where the transfer takes place of the label 7*a* to the corresponding container 10, the control means 20 command a second reduction in the speed of the unwinding assembly 3, so that the subsequent adhesive bonding region 14 is positioned with its resting contact surfaces 14*a* and 14*b* at the trailing edge of the label 7*b* that remained attached to the ribbon 4 and of the leading edge of the label 7*c* consecutive thereto, as FIG. 6 shows, thus resuming the operation as described above.

If the sensor 18 detects the absence of one or more containers 10 on the conveyor 11, once the adhesive bonding region 14 on which rests the trailing edge of the label intended for the last container 10 present before the absence passes in front of the spreading roller 12, the control means 20 command the activation of the movement means 21 of the spreading roller 12 so as to bring it from the active position to the inactive position, and command the arrest, or possibly the slowing, of the unwinding assembly 3, so that no label is dispensed by the transfer drum 2 at the absence.

Subsequently, when the sensor 18 detects the presence of the first container after the absence, the control means 20 command the reactivation of the unwinding assembly 3 and the return of the spreading roller 12 to the active position, so that the transfer drum 2 can resume dispensing the labels to the containers 10 arriving from the conveyor 11.

FIGS. 7 to 13 show a sequence of steps of operation of the machine in the event of the absence of a container 10 in the flow of incoming containers on the conveyor 11. For greater clarity of description, in these figures, the adhesive bonding regions of the transfer drum 2 are designated with 140*a*, 140*b*, 140*c* and 140*d*, while the containers immediately before and immediately after the absence are designated respectively with 10*a* and 10*b*.

Figure 7:
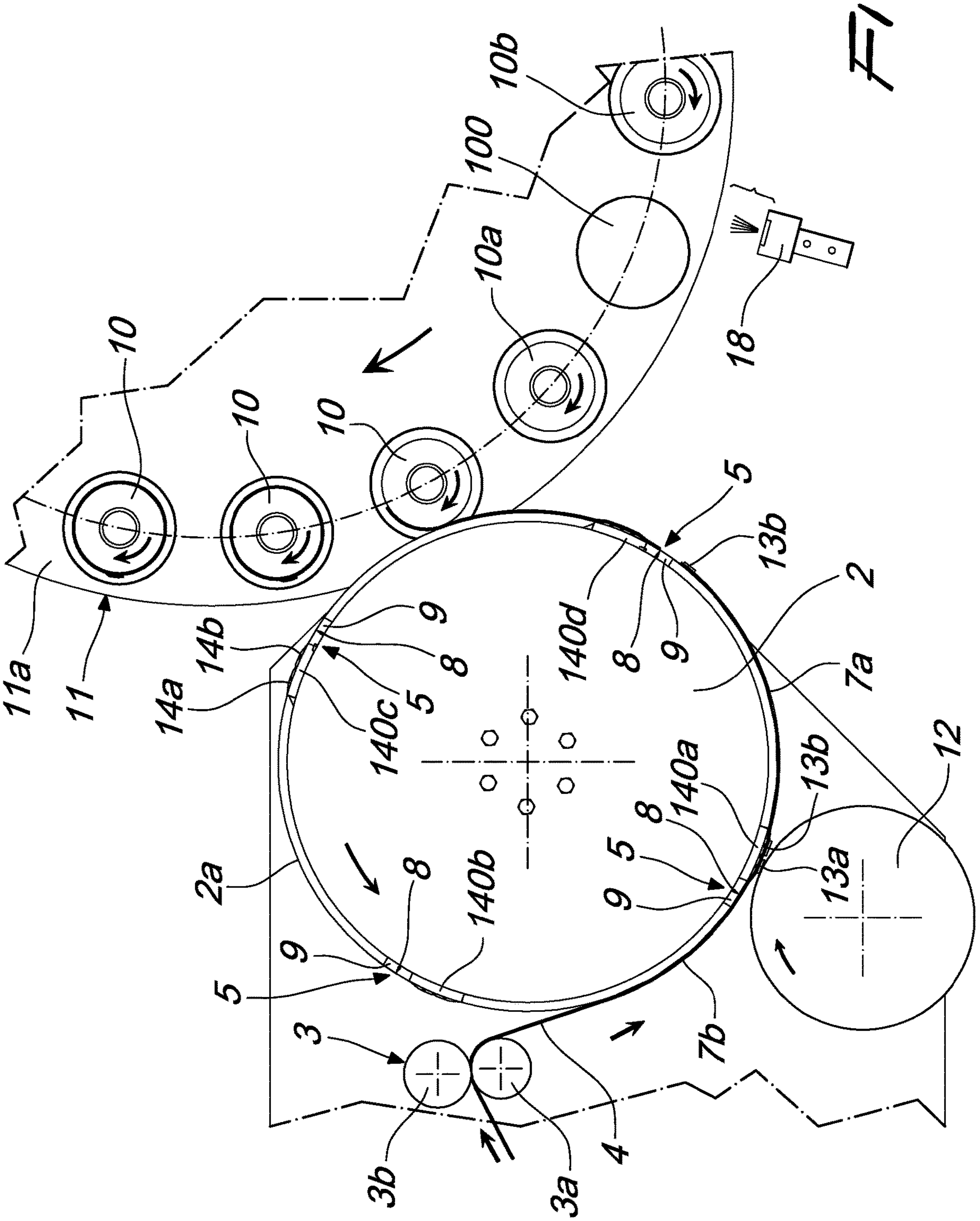
FIGS. 7 to 13 are schematic views of the operation of the machine according to the invention if a container is missing on the conveyor.

In more detail, FIG. 7 shows a situation in which the sensor 18 has detected the absence of the container in a station 100 of the conveyor 11 and the spreading roller 12 has supplied, when the adhesive bonding region 140*a* passed in front of it, the strips of adhesive 13*a*, 13*b* respectively on the trailing edge of the label 7*a* intended for the container 10*a* immediately before the station 100 on the conveyor 11 and on the leading edge of the label 7*b* intended for the container 10*b* immediately after the station 100.

Figure 8:
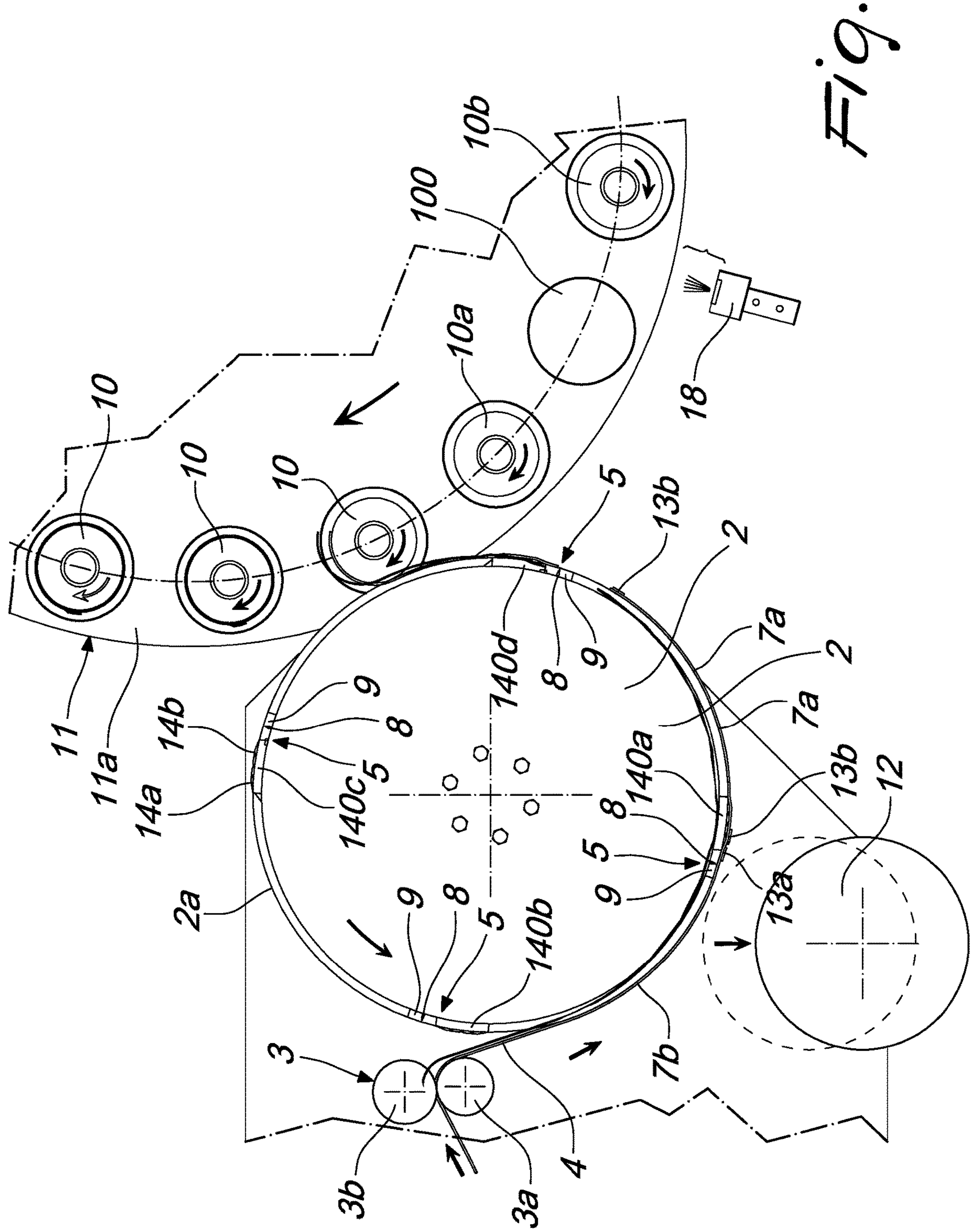

As shown in FIG. 8, as soon as the adhesive bonding region 140*a* has passed on, the spreading roller 12 is retracted to the inactive position and the ribbon 4 begins to slow down, slipping with respect to the transfer drum 2 in order to be positioned correctly for the cutting of the label 7*a*.

Figure 9:
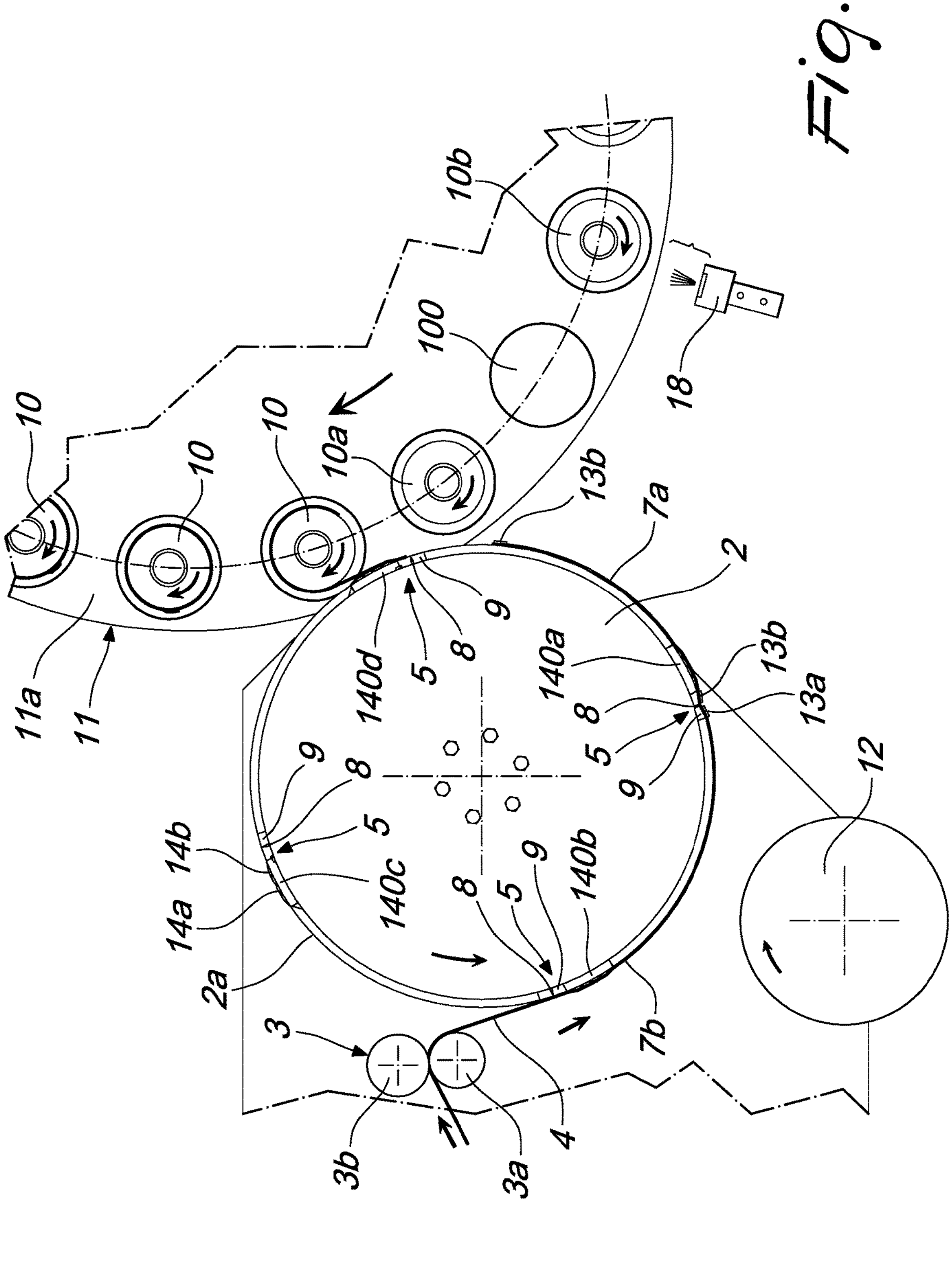

As shown in FIG. 9, after the label 7*a* has been cut, the ribbon 4 starts to slow further in order to be positioned correctly for the subsequent spreading of adhesive, which will take place at the adhesive bonding region 140*c* instead of at the adhesive bonding region 140*b*.

Figure 10:
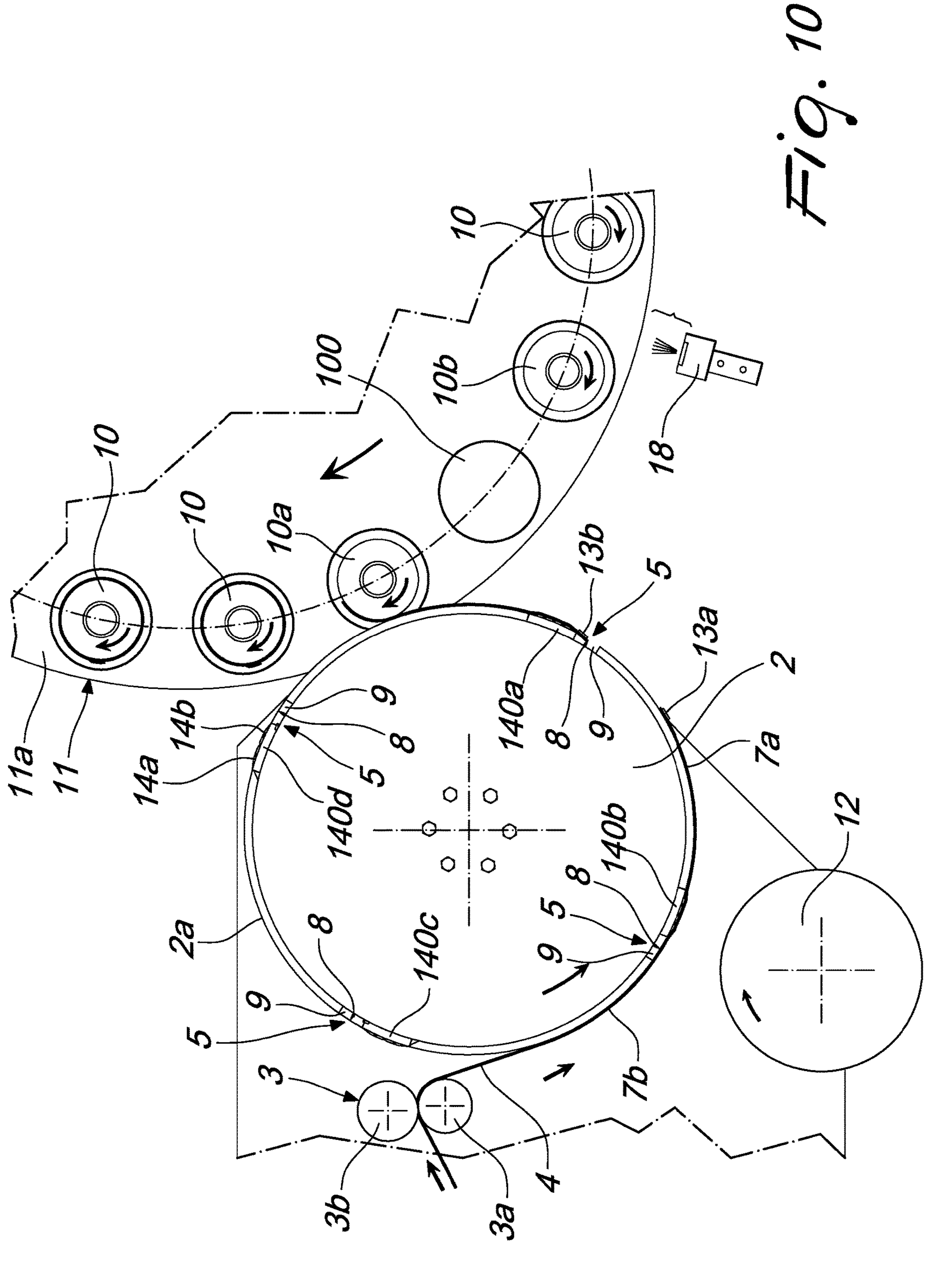

In FIG. 10, the label 7*a*, already cut, is applied to the container 10*a*, the ribbon 4 is kept still so that it slips on the transfer drum 2, and the adhesive bonding region 140*b* passes in front of the spreading roller 12 without the label 7*b* being smeared with adhesive, since the spreading roller 12 is still in the inactive position.

Figure 11:
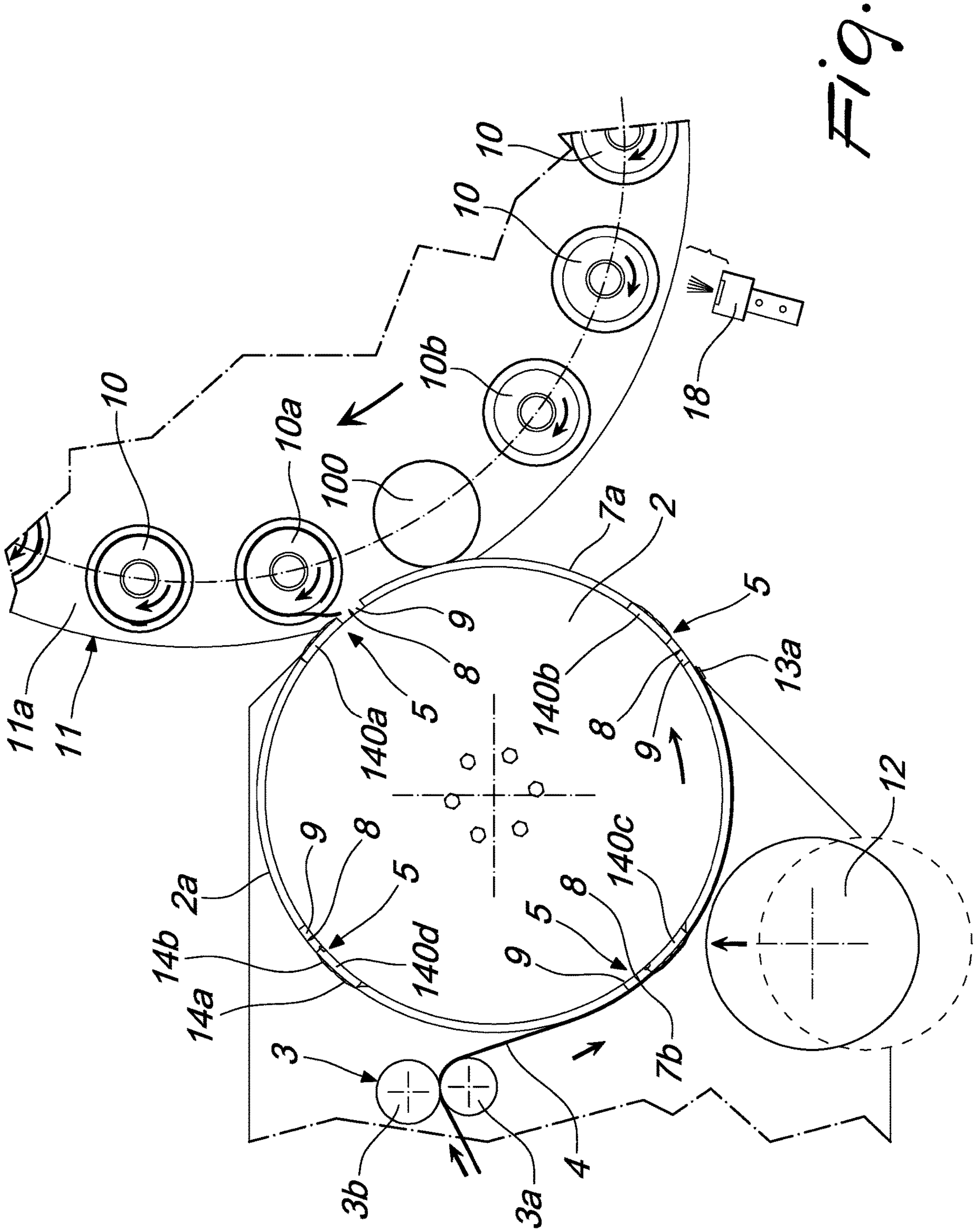

With reference to FIG. 11, the ribbon 4 starts to accelerate, in order to be returned to a speed synchronized with that of the transfer drum 2, as soon as the adhesive bonding region 140*c* arrives proximate to the spreading roller 12, and the spreading roller 12 is returned to the active position.

Figure 12:
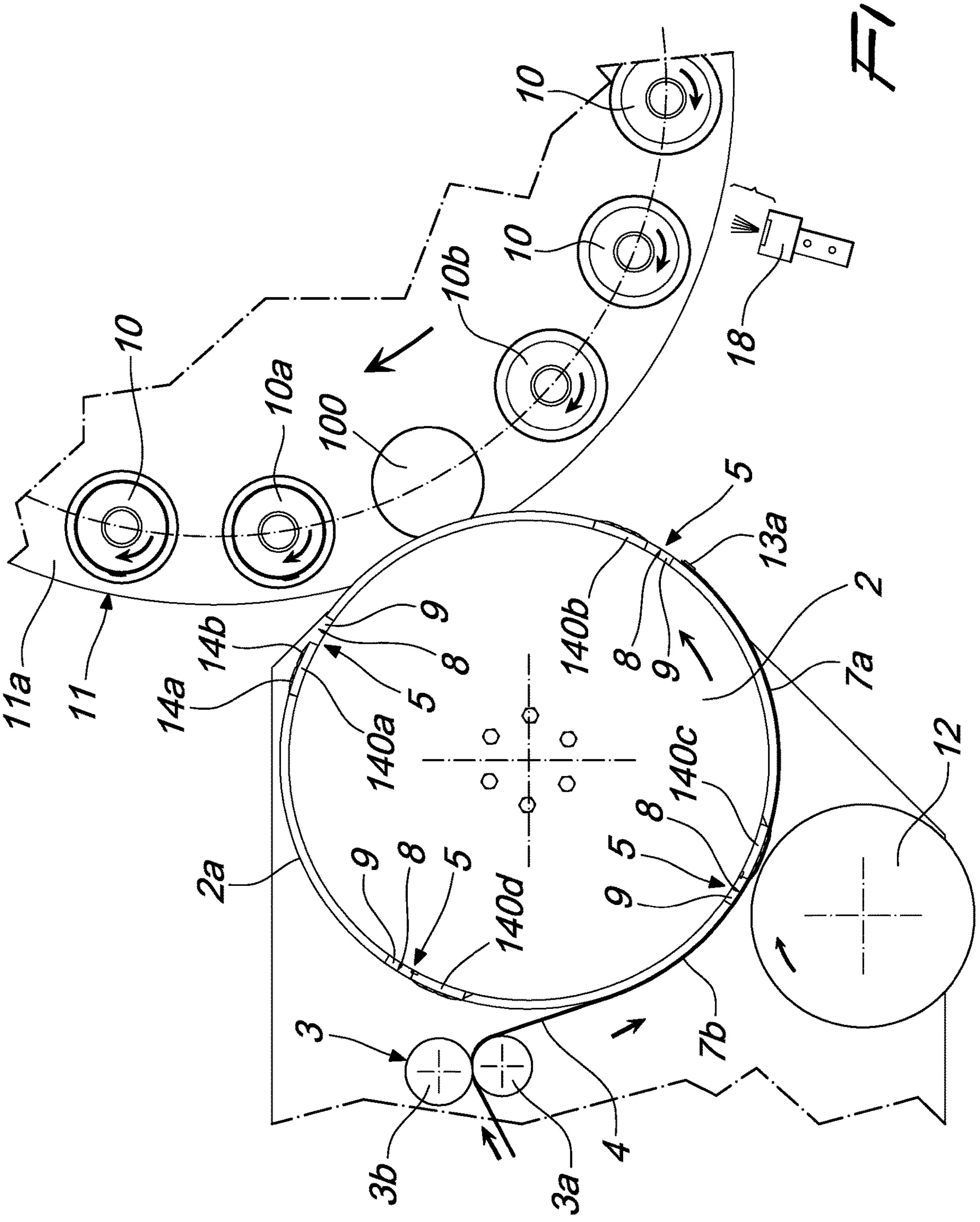
Figure 13:
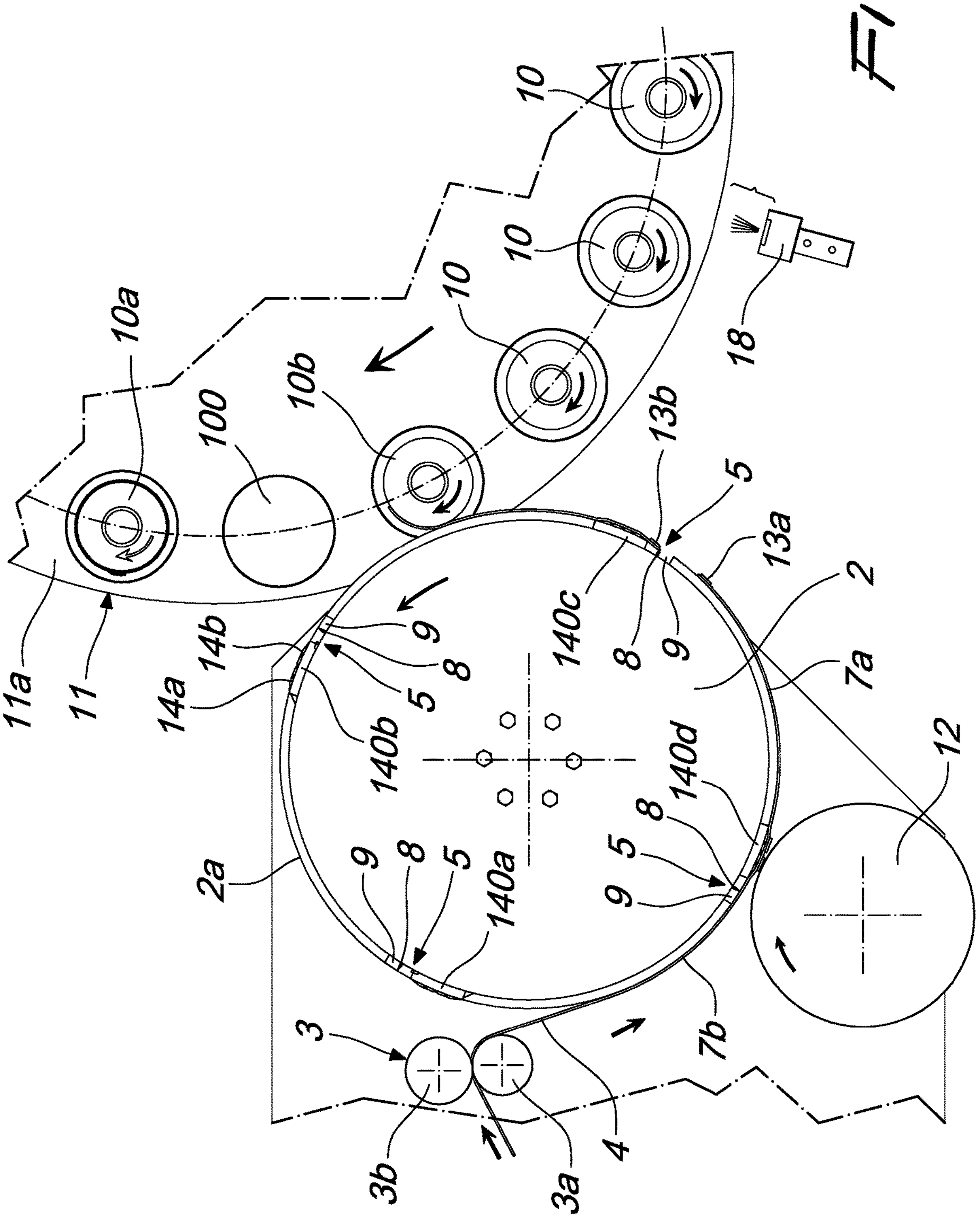

In FIG. 12, the ribbon 4 is returned to a constant speed, which coincides with the peripheral speed of the transfer drum 2, so that the spreading roller 12 can apply the adhesive at the adhesive bonding region 140*c*, and from this moment on the machine resumes its normal operation, following the steps described previously, with the label 7*b* which will then be cut and applied to the bottle 10*b*, as FIG. 13 shows.

From the foregoing it can be seen that the invention is capable of fully achieving the set aim and objects.

All the characteristics of the invention, indicated above as advantageous, convenient or similar, may also be missing or be substituted by equivalent characteristics.

The individual characteristics set out in reference to general teachings or to specific embodiments may all be present in other embodiments or may substitute characteristics in such embodiments.

The invention, thus conceived, is susceptible of numerous modifications and variations, all of which are within the scope of the appended claims.

In practice the materials employed, provided they are compatible with the specific use, and the dimensions and shapes, may be any according to requirements.

Moreover, all the details may be substituted by other, technically equivalent elements.

The disclosures in Italian Patent Application No. 102016000128413 (UA2016A009224) from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A machine for labeling containers, comprising:

a transfer drum fed by an unwinding assembly for unwinding a labeling ribbon on which a plurality of labels are printed continuously thereon, said transfer drum including a lateral surface and being provided with multiple cutting means thereon, wherein the cutting means are distributed around the transfer drum and each cutting means comprises a respective blade that is positioned on and fixed within a respective recessed portion of the lateral surface of the transfer drum such that the labeling ribbon must move into the recessed portion to be cut by the blade, and wherein each cutting means can be activated on command by respective actuation means, also carried on said transfer drum, in order to cut said labeling ribbon at a separation portion between two consecutive labels, said transfer drum being adapted to bring the individual labels, separated after cutting, into contact with corresponding containers supported by a conveyor, a roller for spreading adhesive facing said transfer drum and being positioned to apply to the labels that are present on said labeling ribbon at least one line of adhesive at both a leading edge and a trailing edge of each label prior to separation of each label from the labeling ribbon, wherein each of the actuation means are configured to be activated to separate each label from the labeling ribbon after the at least one line of adhesive is applied to both the leading edge and the trailing edge;

wherein said transfer drum is provided with a plurality of adhesive bonding regions which are distributed mutually spaced apart around said transfer drum, said adhesive bonding regions being, with at least one portion thereof, in relief with respect to the lateral surface of said transfer drum and being adapted to receive, by coming to rest thereon, the leading and trailing edges of the labels that are present on said labeling ribbon, in order to allow, in cooperation with said roller, the application of a respective strip of adhesive on each of the trailing edge of a leading one of two consecutive labels and the leading edge of a trailing one of two consecutive labels, prior to separation of the leading one of two consecutive labels from said labeling ribbon.

2. The machine according to claim 1, wherein said adhesive bonding regions each comprise a respective pair of resting contact surfaces, both arranged in relief with respect to the main lateral surface of said transfer drum and designed to receive respectively, by coming to rest thereon, one the trailing edge and the other the leading edge of two consecutive labels that are present on said labeling ribbon, prior to their separation from said labeling ribbon.

3. The machine according to claim 2, wherein between the resting contact surfaces of said adhesive bonding regions a seat is provided that extends toward the axis of said transfer drum and is adapted to accommodate the separation portion between two consecutive labels that are present on said labeling ribbon, means being provided of attracting said separation portion toward the bottom of said seat.

4. The machine according to claim 1, wherein respective cutting means of cutting said labeling ribbon are associated with each one of said adhesive bonding regions.

5. The machine according to claim 4, wherein said cutting means are arranged to the rear of the respective adhesive bonding region along the direction of rotation of said transfer drum.

6. The machine according to claim 1, wherein said unwinding assembly is controlled by a controller that is adapted to vary a feed rate of said labeling ribbon to said transfer drum by said unwinding assembly during a rotation of said transfer drum.

7. The machine according to claim 6, wherein said controller is adapted to actuate at least one first slowing of the feed rate of said labeling ribbon to said transfer drum, after the passage, at said spreading roller, of the adhesive bonding region on which said labeling ribbon rests, so as to bring the cutting means for the adhesive bonding region on which said labeling ribbon rests to the separation portion of the two consecutive labels on which the spreading roller has applied the adhesive.

8. The machine according to claim 7, wherein said controller is adapted to actuate a second slowing of the feed rate of said labeling ribbon to said transfer drum, after the separation of a label from said labeling ribbon.

9. The machine according to claim 6, wherein said controller is connected to a sensor for detecting a presence of containers on said conveyor, said spreading roller being configured to be movable from an active position, in which it is close to said transfer drum, in order to allow the application of the adhesive to said labeling ribbon, to an inactive position, in which it is spaced apart from said transfer drum, movement of the spreading roller being activateable by said controller is upon the detection, by said sensor, of the lack of at least one container on said conveyor, the time available to bring said spreading roller from said active position to said inactive position corresponds substantially to the time required by an entire division of said transfer drum to pass in front of said spreading roller.

10. A machine for labeling containers, comprising:

a rotatable transfer drum fed by an unwinding assembly that unwinds a labeling ribbon on which a plurality of labels are printed continuously thereon, said transfer drum including a lateral surface and being provided with multiple cutting means thereon, wherein the cutting means are distributed around the transfer drum and each cutting means comprises a respective blade that is positioned on and fixed within a respective recessed portion of the lateral surface of the transfer drum such that the labeling ribbon must move into the recessed portion to be cut by the blade, and wherein each cutting means is configured to be activated for cutting on command by respective actuation means, also positioned on the recessed portion of said lateral surface of said transfer drum for rotation with the transfer drum, that pull said ribbon inward against the cutting means in order to cut said labeling ribbon at a separation portion between two consecutive labels, said transfer drum being positioned and configured to bring the individual labels, separated after cutting, into contact with corresponding containers supported by a conveyor, a roller for spreading adhesive facing said transfer drum and being configured and positioned to apply to the labels that are present on said labeling ribbon at least one line of adhesive at both a leading edge and a trailing edge of each label prior to separation of each label from the labeling ribbon, a controller configured to activate each of the actuation means to separate each label from the labeling ribbon after at least one line of adhesive is applied to both the leading edge and the trailing edge;

wherein said transfer drum is provided with a plurality of adhesive bonding regions which are distributed mutually spaced apart around said transfer drum, said adhesive bonding regions being, with at least one portion thereof, in relief with respect to the lateral surface of said transfer drum and being adapted to receive, by coming to rest thereon, the leading and trailing edges of the labels that are present on said labeling ribbon, in order to allow, in cooperation with said roller, the application of a respective strip of adhesive on each of the trailing edge of a leading one of two consecutive labels and the leading edge of a trailing one of two consecutive labels, prior to separation of the leading one of two consecutive labels from said labeling ribbon.

11. A machine for labeling containers, comprising:

an unwinding assembly that unwinds a labeling ribbon on which a plurality of labels are printed continuously thereon;

a rotatable transfer drum to which the labeling ribbon is fed by the unwinding assembly, said transfer drum including a lateral surface and being provided with multiple cutting means thereon, wherein the cutting means are distributed around the transfer drum and each cutting means is configured to be activated for cutting on command by respective actuation means, also positioned on said transfer drum for rotation with the transfer drum, said transfer drum being positioned and configured to bring individual labels, separated after cutting, into contact with corresponding containers supported by a conveyor, a roller for spreading adhesive facing said transfer drum and being configured and positioned to apply to the labels that are present on said labeling ribbon at least one line of adhesive at both a leading edge and a trailing edge of each label prior to separation of each label from the labeling ribbon;

a controller configured to operate the unwinding assembly and to activate each of the actuation means such that:

the roller applies at least one line of adhesive to the trailing edge of a first label and the leading edge of an immediately following second label while a separation portion between the first label and the second label is at an application position on the lateral surface of the transfer drum, and thereafter, to slow down a feed rate of the labeling ribbon to the transfer drum to reposition the separation portion between the first label and the second label into alignment with cutting means that follows the application position and then activate the actuation means such that the labeling ribbon is cut, by the cutting means aligned with the separation portion, between the line of adhesive applied to the trailing edge of the first label and the line of adhesive applied to the leading edge of the second label;

wherein said transfer drum is provided with a plurality of adhesive bonding regions which are distributed mutually spaced apart around said transfer drum, said adhesive bonding regions being, with at least one portion thereof, in relief with respect to the lateral surface of said transfer drum and being adapted to receive, by coming to rest thereon, the leading and trailing edges of the labels that are present on said labeling ribbon, in order to allow, in cooperation with said roller, the application of a respective strip of adhesive on each of the trailing edge of a leading one of two consecutive labels and the leading edge of a trailing one of two consecutive labels, prior to separation of the leading one of two consecutive labels from said labeling ribbon.

* * * * *